United States Patent
Fischer et al.

(10) Patent No.: US 7,552,942 B2
(45) Date of Patent: Jun. 30, 2009

(54) VEHICLE OCCUPANT PROTECTION APPARATUS HAVING VENT MEMBER THAT IS CONTROLLED BY A RELEASABLE TETHER

(75) Inventors: Kurt F. Fischer, Leonard, MI (US); Douglas M. Gould, Lake Orion, MI (US); Angelo Adler, Armada, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 381 days.

(21) Appl. No.: 11/165,069

(22) Filed: Jun. 23, 2005

(65) Prior Publication Data

US 2006/0290117 A1 Dec. 28, 2006

(51) Int. Cl.
*B60R 21/16* (2006.01)
*B60R 21/18* (2006.01)
*B60R 21/276* (2006.01)

(52) U.S. Cl. ............... 280/743.2; 280/739; 280/743.1; 280/734; 280/742

(58) Field of Classification Search ............... 280/739, 280/743.1, 743.2, 734, 742
See application file for complete search history.

(56) References Cited

U.S. PATENT DOCUMENTS

| | | | |
|---|---|---|---|
| 5,887,894 A | 3/1999 | Castagner et al. | |
| 6,390,501 B1 | 5/2002 | Greib et al. | |
| 6,454,300 B1 * | 9/2002 | Dunkle et al. | 280/742 |
| 6,616,184 B2 | 9/2003 | Fischer | |
| 6,648,371 B2 * | 11/2003 | Vendely et al. | 280/739 |
| 6,659,499 B2 | 12/2003 | Jenkins | |
| 6,669,231 B2 * | 12/2003 | Ryan | 280/736 |
| 6,773,030 B2 | 8/2004 | Fischer | |
| 6,814,372 B1 * | 11/2004 | Kang et al. | 280/740 |
| 6,832,778 B2 * | 12/2004 | Pinsenschaum et al. | 280/739 |
| 7,021,656 B2 * | 4/2006 | Okamoto et al. | 280/739 |
| 7,083,192 B2 * | 8/2006 | Fischer et al. | 280/739 |
| 7,275,761 B2 * | 10/2007 | Gould et al. | 280/742 |
| 2002/0036400 A1 | 3/2002 | Winters et al. | |
| 2002/0117840 A1 | 8/2002 | Dunkle et al. | |
| 2004/0051285 A1 * | 3/2004 | Fischer | 280/739 |
| 2005/0104347 A1 | 5/2005 | Hawthorn et al. | |

FOREIGN PATENT DOCUMENTS

| | | |
|---|---|---|
| DE | 10300156 | 8/2003 |
| DE | 10332549 | 3/2004 |
| DE | 102004027703 | 4/2005 |

* cited by examiner

*Primary Examiner*—Christopher P Ellis
*Assistant Examiner*—Jacob Meyer
(74) *Attorney, Agent, or Firm*—Tarolli, Sundheim, Covell & Tummino LLP

(57) ABSTRACT

A vehicle occupant protection apparatus (10) includes an inflatable occupant protection device (38) and a support member (56) having a vent opening (78) through which inflation fluid may flow. A vent member (106) is movable relative to the support member (56) for varying a flow of inflation fluid through the vent opening (78). The vehicle occupant protection apparatus (10) also includes a tether (144) for moving the vent member (106) and an actuatable mechanism (170) that has a first condition preventing the tether (144) from moving the vent member (106) and a second condition enabling the tether (144) to move the vent member (106).

19 Claims, 7 Drawing Sheets

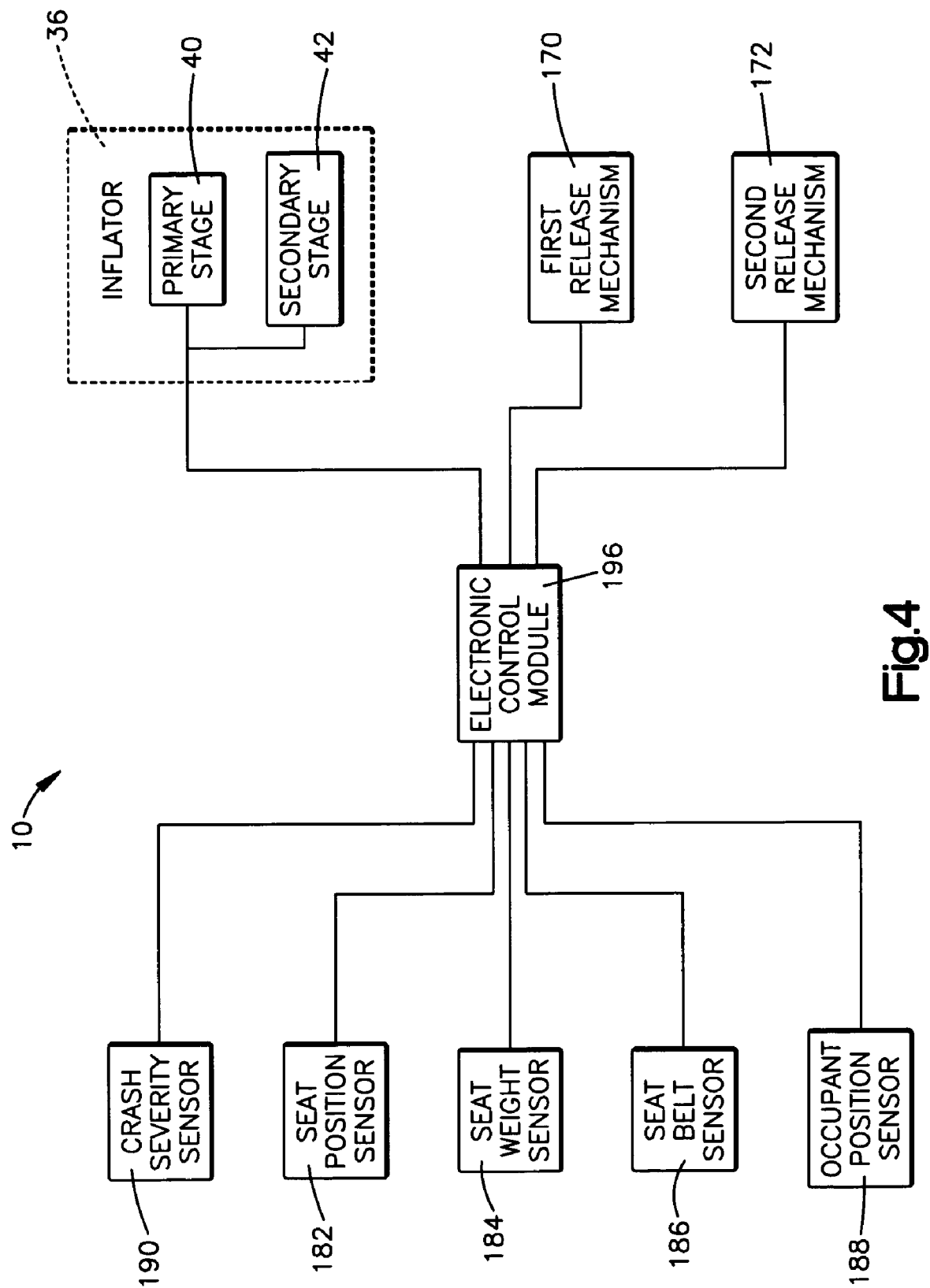

| BAG DEPTH | INFLATION PRESSURE | FUNCTION |
|---|---|---|
| SMALL | LOW | DO NOT RELEASE THE TETHERS |
| MEDIUM | MEDIUM | RELEASE ONE TETHER AFTER EXPANSION OF AIR BAG TO SMALL DEPTH |
| MEDIUM | HIGH | RELEASE ONE TETHER PRIOR TO EXPANSION OF AIR BAG TO SMALL DEPTH |
| LARGE | LOW | RELEASE BOTH TETHERS AFTER EXPANSION OF AIR BAG TO SMALL DEPTH |
| LARGE | MEDIUM | RELEASE ONE TETHER PRIOR TO EXPANSION OF AIR BAG TO SMALL DEPTH AND ONE AFTER EXPANSION TO SMALL DEPTH |
| LARGE | HIGH | RELEASE BOTH TETHERS PRIOR TO EXPANSION OF THE AIR BAG TO SMALL DEPTH |

Fig.5

VEHICLE OCCUPANT PROTECTION APPARATUS HAVING VENT MEMBER THAT IS CONTROLLED BY A RELEASABLE TETHER

TECHNICAL FIELD

The present invention relates to a vehicle occupant protection apparatus and, more particularly, to a vehicle occupant protection apparatus having an inflatable device.

BACKGROUND OF THE INVENTION

It is known to provide air bag modules with tethers that may be released for controlling the volume and shape of an inflated air bag. U.S. Pat. No. 6,616,184, which is assigned to the assignee of the present invention, discloses an apparatus in which a control module is responsive to signals from occupant condition signals for selectively releasing tethers to control the volume and shape of an inflated air bag.

It is also known to provide air bag modules with vent openings through which inflation fluid may be discharged. When an occupant of a vehicle is positioned in a location such that an air bag will contact the occupant while the air bag is still being inflated, the vent openings enable inflation fluid to be discharged from the air bag to atmosphere. The discharge of inflation fluid through the vent openings reduces the contact force between the inflating air bag and the occupant.

Unites States Patent Application Publication No. 2004/0051285 A1, which is assigned to the assignee of the present invention, discloses an air bag module having a support member that includes vent openings through which inflation fluid may flow. Each vent opening of the air bag module has an associated vent member. A tether connects each vent member to an outer panel of the air bag. When the air bag inflates beyond a predetermined distance relative to the support member, the tethers close the vent members to reduce the flow of inflation fluid through the vent openings.

SUMMARY OF THE INVENTION

The present invention relates to a vehicle occupant protection apparatus comprising an inflatable occupant protection device and a support member having a vent opening through which inflation fluid may flow. A vent member is movable relative to the support member for varying a flow of inflation fluid through the vent opening. The vehicle occupant protection apparatus also comprises a tether for moving the vent member and an actuatable mechanism that has a first condition preventing the tether from moving the vent member and a second condition enabling the tether to move the vent member.

According to another aspect, the present invention relates to a vehicle occupant protection apparatus comprising an inflatable occupant protection device and a support member having a vent opening through which inflation fluid may flow. The vehicle occupant protection apparatus also comprises a movable vent member for varying a flow of inflation fluid through the vent opening. A tether extends between the inflatable occupant protection device and the vent member. The vehicle occupant protection apparatus further comprises a mechanism for securing a portion of the tether relative to the support member. The mechanism is actuatable for releasing the portion of the tether. The tether, when released, is responsive to inflation of the inflatable occupant protection device away from the support member by more than a predetermined distance for moving the vent member relative to the support member for varying the flow of fluid through the vent opening.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 4 is a schematic block diagram of the vehicle occupant protection apparatus of FIG. 1;

FIG. 5 sets forth six combinations of bag depth and inflation pressure that may be obtained for the inflated air bag of the vehicle occupant protection apparatus of FIG. 1;

DETAILED DESCRIPTION OF THE INVENTION

Figure 1:
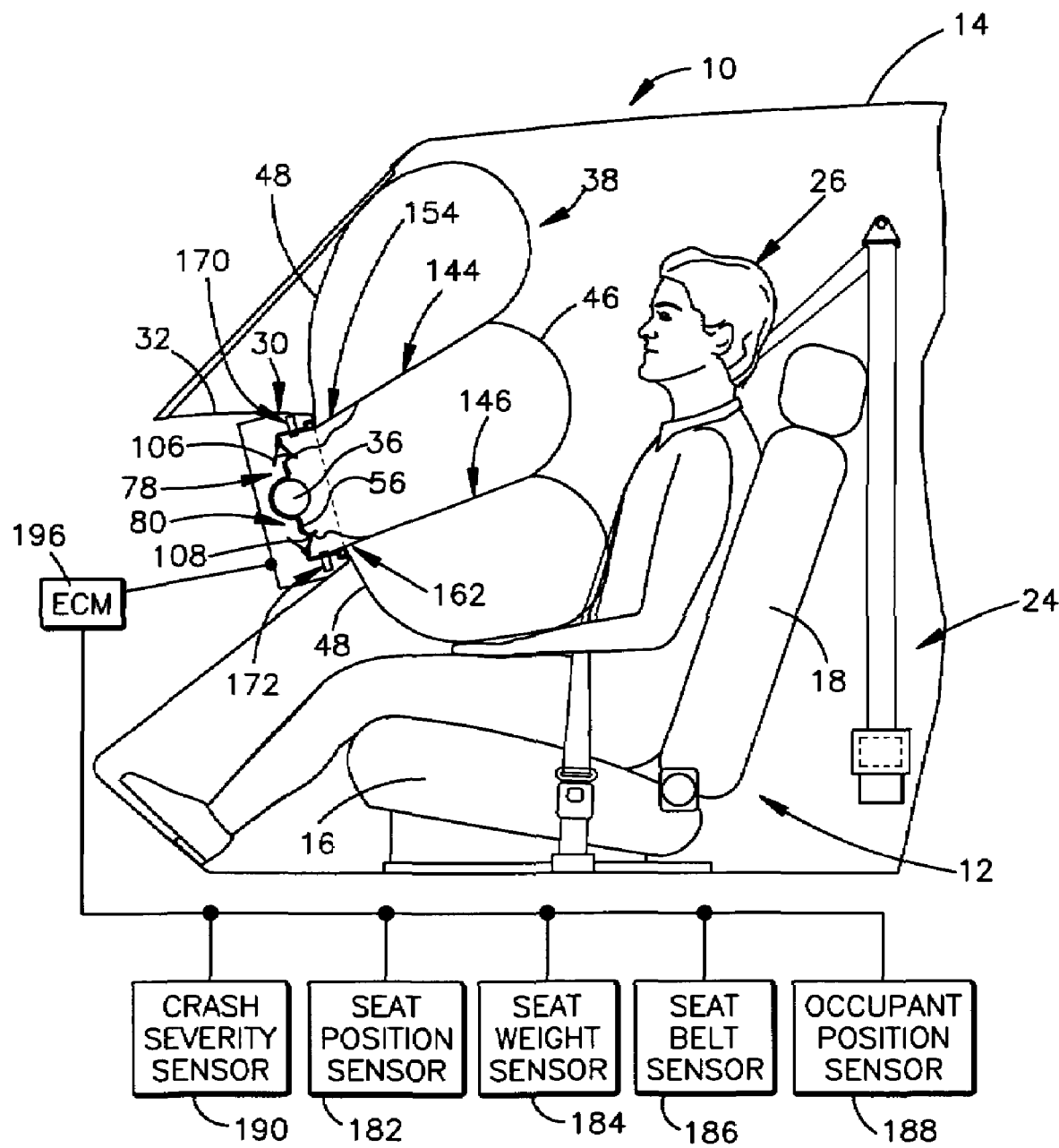
FIG. 1 is a schematic representation of a vehicle occupant protection apparatus constructed in accordance with the present invention and in which an air bag is inflated to a minimum inflation volume.

FIG. 1 illustrates a vehicle occupant protection apparatus 10 constructed in accordance with the present invention. The vehicle occupant protection apparatus 10 illustrated in FIG. 1 is associated with a passenger seat 12 of a vehicle 14. The passenger seat 12 includes a cushion portion 16 and a backrest portion 18. A seat belt assembly 24 is also associated with the passenger seat 12. FIG. 1 illustrates the seat belt assembly 24 helping to restrain an occupant 26 of the passenger seat 12.

The vehicle occupant protection apparatus 10 includes an air bag module 30. FIG. 1 illustrates the air bag module 30 mounted in the instrument panel 32 of the vehicle 14. When the vehicle occupant protection apparatus 10 is associated with a driver seat, the air bag module 30 may be mounted in the steering wheel (not shown) of the vehicle 14.

The air bag module 30 includes an inflator 36 and an air bag 38. The inflator 36 is actuatable for providing inflation fluid for inflating the air bag 38. The inflator 36 may be any known type of inflator. In a preferred embodiment, the inflator 36 is a two-stage inflator that includes independently actuatable primary and secondary stages 40 and 42, as shown schematically in FIG. 4.

The air bag 38 includes an outer panel 46 and side panels 48 that collectively define an inflatable volume of the air bag. Ends of the side panels 48 opposite the outer panel 46 define a mouth portion 50 (FIGS. 2 and 3) of the air bag 38. Inflation fluid flows through the mouth portion 50 of the air bag 38 and into the inflatable volume for inflating the air bag from a deflated and stored condition to an inflated condition.

Figure 2:
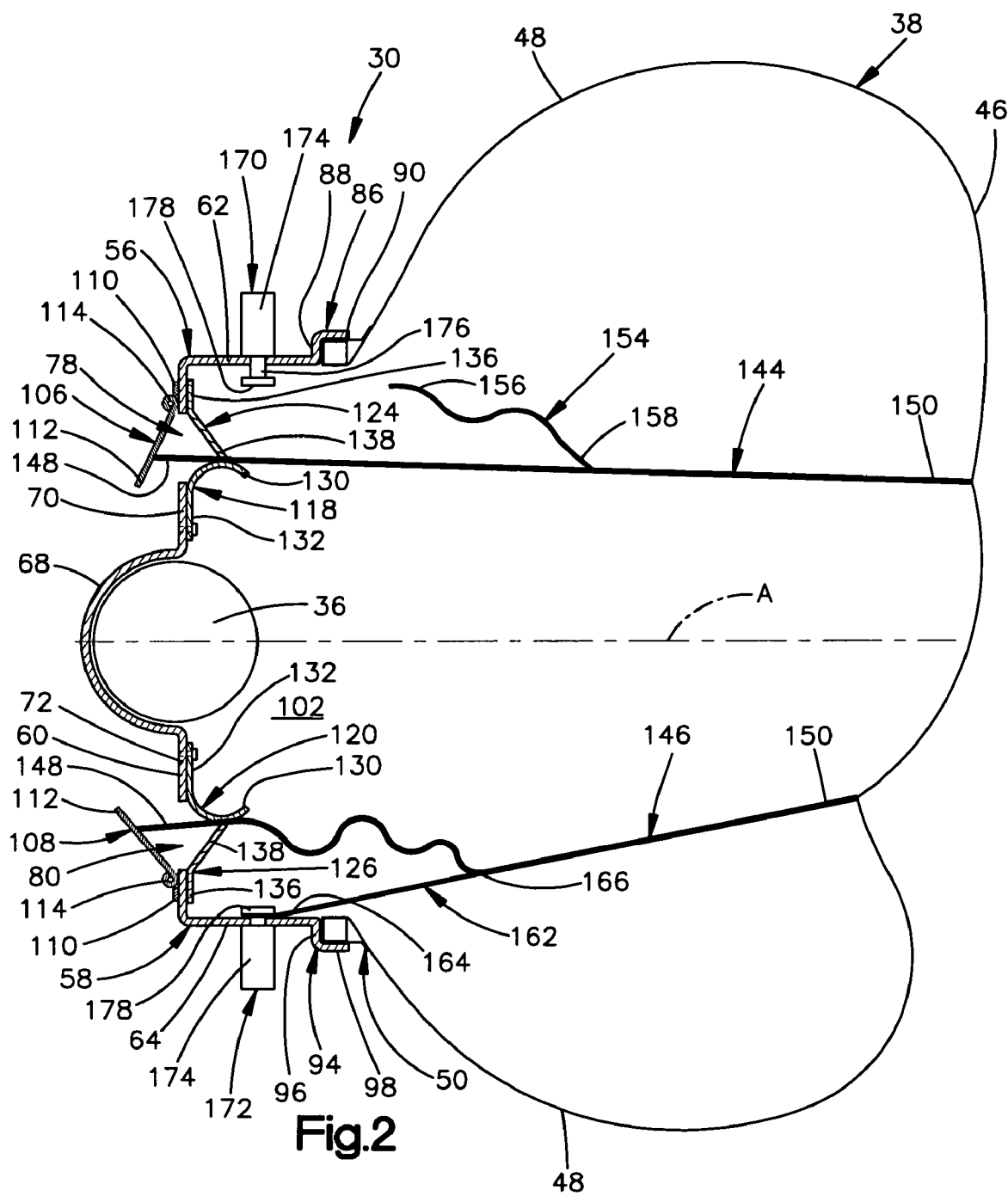
FIG. 2 is an illustration of an inflating air bag of the vehicle occupant protection apparatus of FIG. 1, in which one of two tethers has been released and a vent member associated with the released tether is partially closed.
Figure 3:
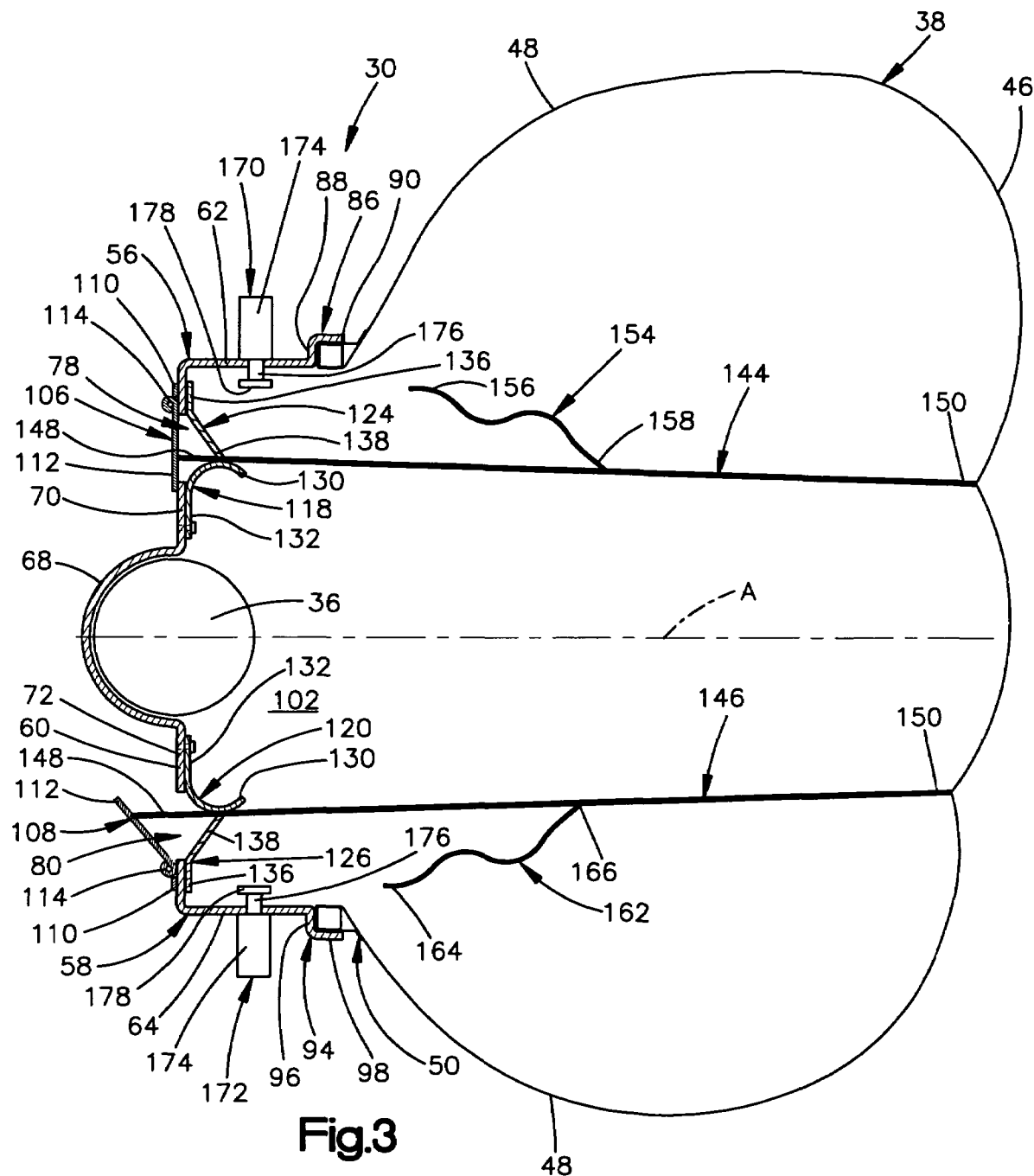
FIG. 3 is an illustration of an inflated air bag of the vehicle occupant protection apparatus of FIG. 1, in which both tethers have been released, a vent member associated with one of the tether is closed, and a vent member associated with the other tether remains open.

The air bag module 30 also includes a support member 56. The support member 56 illustrated in FIGS. 1-3 is a reaction can. The reaction can 56 supports the inflator 36 and the air bag 38 and receives the reaction forces associated with actuation of the inflator and inflation of the air bag.

The reaction can 56 is preferably made from metal. With reference to FIG. 2, the reaction can 56 includes a main body portion 58 having an end wall 60 and opposite upper and lower walls 62 and 64, respectively. The end wall 60 includes a semi-cylindrical center portion 68 that separates opposite upper and lower portions 70 and 72, respectively. The center portion 68 of the end wall 60 is sized for receiving a portion of the inflator 36. A first vent opening 78 (FIGS. 2 and 3) extends through the upper portion 70 of the end wall 60. A second vent opening 80 (FIGS. 2 and 3) extends through the lower portion 72 of the end wall 60.

The upper wall 62 of the main body portion 58 of the reaction can 56 extends away from the upper portion 70 of the end wall 60. The upper wall 62 connects to an end of the upper portion 70 of the end wall 60 opposite the center portion 68. The upper wall 62 is oriented generally perpendicular to the upper portion 70 of the end wall 60. FIGS. 2 and 3 illustrated the upper wall 62 as extending in a direction generally parallel to axis A.

The upper wall 62 terminates at an end opposite the end wall 60 with a generally L-shaped retaining portion 86. A first portion 88 of the retaining portion 86 extends away from the upper wall 62 and is oriented generally perpendicular to axis A. A second portion 90 of the retaining portion 86 extends away from the first portion 88 and is oriented generally parallel to axis A.

The lower wall 64 of the main body portion 58 of the reaction can 56 is a mirror-image of the upper wall 62. The lower wall 64 extends away from the lower portion 72 of the end wall 60. The lower wall 64 connects to an end of the lower portion 72 of the end wall 60 opposite the center portion 68. The lower wall 64 is oriented generally perpendicular to the lower portion 72 of the end wall 60 and extends in a direction generally parallel to axis A.

The lower wall 64 also terminates at an end opposite the end wall 60 with a generally L-shaped retaining portion 94. A first portion 96 of the retaining portion 94 extends away from the lower wall 64 and is oriented generally perpendicular to axis A. A second portion 98 of the retaining portion 94 extends away from the first portion 96 and is oriented generally parallel to axis A.

The reaction 56 can also includes opposite side wall portions (not shown) that close laterally opposite sides of the main body portion 58 of the reaction can. A chamber 102 is located within the reaction can 56. An open end of the chamber 102 is defined between the retaining portions 86 and 94 of the upper and lower walls 62 and 64, respectively.

The air bag module 30 also includes first and second vent members 106 and 108, respectively. The first vent member 106 is associated with the first vent opening 78 and the second vent member 108 is associated with the second vent opening 80. The first and second vent members 106 and 108 illustrated in FIGS. 1-3 are identical to one another. As shown with reference to FIG. 2, the first and second vent members 106 and 108 each include an attaching portion 110 and a closing portion 112. A hinge 114 separates the attaching portion 110 and the closing portion 112 and enables movement of the closing portion relative to the attaching portion. The hinge 114 resists movement of the closing portion 112 relative to the attaching portion 110 until a force exceeding a predetermined value is applied to the closing portion.

The attaching portion 110 of the first vent member 106 is secured to the upper portion 70 of the end wall 60 of the reaction can 56 in a location for positioning the closing portion 112 over the first vent opening 78. The closing portion 112 of the first vent member 106 has dimensions that are greater than the dimension of the first vent opening 78 so that the first vent member completely closes the first vent opening. The closing portion 112 of the first vent member 106 is movable relative to the attaching portion 110 of the first vent member and relative to the reaction can 56 for varying a flow area through which fluid may flow when exiting the reaction can through the first vent opening 78. Thus, the closing portion 112 of the first vent member 106 is movable relative to the attaching portion 110 of the first vent member and relative to the reaction can 56 for varying a flow of inflation fluid away from the air bag 38 through the first vent opening 78.

The attaching portion 110 of the second vent member 108 is secured to the lower portion 72 of the end wall 60 of the reaction can 56 in a location for positioning the closing portion 112 over the second vent opening 80. The closing portion 112 of the second vent member 80 has dimensions that are greater than the dimension of the second vent opening 80 so that the second vent member completely closes the second vent opening. The closing portion 112 of the second vent member 108 is movable relative to the attaching portion 110 of the second vent member and relative to the reaction can 56 for varying a flow area through which fluid may flow when exiting the reaction can through the second vent opening 80. Thus, the closing portion 112 of the second vent member 108 is movable relative to the attaching portion 110 of the second vent member and relative to the reaction can 56 for varying a flow of inflation fluid away from the air bag 38 through the second vent opening 80.

The air bag module 30 also includes first and second tether guides 118 and 120, respectively, and first and second tether locking members 124 and 126, respectively. The first tether guide 118 and the first tether locking member 124 are associated with the first vent opening 78. The second tether guide 120 and the second tether locking member 126 are associated with the second vent opening 80.

The first and second tether guides 118 and 120 are identical with one another. Each of the first and second tether guides 118 and 120 includes a curved tether guide portion 130 and an attaching portion 132. The attaching portion 132 of the first tether guide 118 is attached to the upper portion 70 of the end wall 60 of the reaction can 56 in a location adjacent the center portion 68 of the end wall. When the attaching portion 132 of the first tether guide 118 is secured to the upper portion 70 of the end wall 60, the tether guide portion 130 of the first tether guide 118 is located in the chamber 102 of the reaction can 56 immediately adjacent the first vent opening 78. The attaching portion 132 of the second tether guide 120 is attached to the lower portion 72 of the end wall 60 of the reaction can 56 in a location adjacent the center portion 68 of the end wall. When the attaching portion 132 of the second tether guide 120 is secured to the lower portion 72 of the end wall 60, the tether guide portion 130 of the second tether guide 120 is located in the chamber 102 of the reaction can 56 immediately adjacent the second vent opening 80.

The first and second tether locking members 124 and 126 are also identical to one another. Each of the first and second tether locking members 124 and 126 is a resilient, one-piece structure that includes a base portion 136 and a lock portion 138. The lock portion 138 is oriented at an obtuse angle relative to the base portion 136. The base portion 136 of the first tether locking member 124 is attached to the upper portion 70 of the end wall 60 of the reaction can 56 at a location between the first vent opening 78 and the upper wall 62. An end of the lock portion 138 of the first tether locking member 124 terminates adjacent the tether guide portion 130 of the first tether guide member 118. The base portion 136 of the second tether locking member 126 is attached to the lower portion 72 of the end wall 60 of the reaction can 56 at a location between the second vent opening 80 and the lower wall 64. An end of the lock portion 138 of the second tether locking member 126 terminates adjacent the tether guide portion 130 of the second tether guide member 120.

The air bag module 30 also includes first and second tethers 144 and 146, respectively. The first tether 144 is associated with the first vent member 106 and the second tether 146 is associated with the second vent member 108. Each of the first and second tethers 144 and 146 has opposite first and second end portions 148 and 150.

The first end portion 148 of the first tether 144 is fixed to the closing portion 112 of the first vent member 106 and the second end portion 150 is secured to the outer panel 46 of the air bag 38. The first tether 144 also includes a restraining portion 154. The restraining portion 154 is attached to the first tether 144 at a location intermediate the first and second end portions 148 and 150. Alternatively, the restraining portion 154 of the first tether 144 may be formed from a portion of the first tether intermediate the first and second end portions 148 and 150. FIGS. 1-3 illustrate the restraining portion 154 of the first tether 144 as being a length of fabric having opposite first and second ends 156 and 158, respectively. The second end 158 of the restraining portion 154 is sewn to the first tether 144 at a location intermediate the first and second end portions 148 and 150. The restraining portion 154 of the first tether 144 has a length that is shorter than a distance between the location on the first tether at which the second end 158 of the restraining portion is attached and the first end portion 148 of the first tether, as shown in FIG. 2.

When extending between the outer panel 46 of the air bag 38 and the first vent member 106, the first tether 144 extends between the first tether guide 118 and the first tether locking member 124. The first tether locking member 124 cooperates with the first tether guide 118 to prevent movement of the first tether 144 leftward, as viewed in FIGS. 2 and 3, between the first tether locking member and the first tether guide and toward the first vent member 106. The lock portion 138 of the first tether locking member 124 bends rightward, as viewed in FIGS. 2 and 3, to enable movement of the first tether 144 rightward between the first tether locking member and the first tether guide 118 and toward the outer panel 46 of the air bag 38.

The first end portion 148 of the second tether 146 is fixed to the closing portion 112 of the second vent member 108 and the second end portion 150 is secured to the outer panel 46 of the air bag 38. The second tether 146 also includes a restraining portion 162. The restraining portion 162 is attached to the second tether 146 at a location intermediate the first and second end portions 148 and 150. Alternatively, the restraining portion 162 of the second tether 146 may be formed from a portion of the second tether intermediate the first and second end portions 148 and 150. FIGS. 1-3 illustrate the restraining portion 162 of the second tether 146 as being a length of fabric having opposite first and second ends 164 and 166. The second end 166 of the restraining portion 162 is sewn to the second tether 146 at a location intermediate the first and second end portions 148 and 150. The restraining portion 162 of the second tether 146 has a length that is shorter than a distance between the location on the second tether at which the second end 166 of the restraining portion 162 is attached and the first end portion 148 of the second tether, as shown in FIG. 2.

When extending between the outer panel 46 of the air bag 38 and the second vent member 108, the second tether 146 extends between the second tether guide 120 and the second tether locking member 126. The second tether locking member 126 cooperates with the second tether guide 120 to prevent movement of the second tether 146 leftward, as viewed in FIGS. 2 and 3, between the second tether locking member and the second tether guide and toward the second vent member 108. The lock portion 138 of the second tether locking member 126 bends rightward, as viewed in FIGS. 2 and 3, to enable movement of the second tether 146 rightward between the second tether locking member and the second tether guide 120 and toward the outer panel 46 of the air bag 38.

The air bag module 30 also includes first and second release mechanisms 170 and 172, respectively. In the air bag module 30 illustrated in FIGS. 1-3, the first release mechanism 170 is attached to the upper wall 62 of the reaction can 56 and the second release mechanism 172 is attached to the lower wall 64 of the reaction can.

As shown in FIGS. 2 and 3, each of the first and second release mechanisms 170 and 172 is a solenoid mechanism that includes an actuator portion 174 and an arm portion 176. An anchor plate 178 is located on an end of the arm portion 176.

When the first release mechanism 170 is attached to the upper wall 62 of the reaction can 56, the actuator portion 174 is located outside of the chamber 102 and the arm portion 176 extends through an aperture in the upper wall to support the anchor plate 178 within the chamber. When the first release mechanism 170 is in an unactuated condition, the anchor plate 178 is in abutting contact with the upper wall 62 of the reaction can 56. When the first release mechanism 170 is in an actuated condition, the anchor plate 178 is moved away from the upper wall 62 of the reaction can 56, as shown in FIG. 2.

As shown in FIG. 2, the first release mechanism 170 secures the first end 156 of the restraining portion 154 of the first tether 144 to the reaction can 56. The first end 156 of the restraining portion 154 of the first tether 144 is secured between the anchor plate 178 of the first release mechanism 170 and the upper wall 62 of the reaction can 56. While the first release mechanism 170 is unactuated, the first end 156 of the restraining portion 154 of the first tether 144 remains secured relative to the upper wall 62. When the first release mechanism 170 is actuated, the anchor plate 178 moves away from the upper wall 62 of the reaction can 56 to release the first end 156 of the restraining portion 154 of the first tether 144.

When the second release mechanism 172 is attached to the lower wall 64 of the reaction can 56, the actuator portion 174 is located outside of the chamber 102 and the arm portion 176 extends through an aperture in the lower wall to support the anchor plate 178 within the chamber. When the second release mechanism 172 is in an unactuated condition, the anchor plate 178 is in abutting contact with the lower wall 64 of the reaction can 56. When the second release mechanism 172 is in an actuated condition, the anchor plate 178 is moved away from the lower wall 64 of the reaction can 56.

The second release mechanism 172 secures the first end 164 of the restraining portion 162 of the second tether 146 to the reaction can 56. The first end 164 of the restraining portion 162 of the second tether 146 is secured between the anchor plate 178 of the second release mechanism 172 and the lower wall 64 of the reaction can 56. While the second release mechanism 172 is unactuated, the first end 164 of the restraining portion 162 of the second tether 146 remains secured relative to the lower wall 64. When the second release mechanism 172 is actuated, the anchor plate 178 moves away from the lower wall 64 of the reaction can 56 to release the first end 164 of the restraining portion 162 of the second tether 146.

With reference to FIGS. 1 and 4, the vehicle occupant protection apparatus 10 also includes sensors for sensing vehicle occupant conditions and for providing occupant condition signals indicative of the sensed occupant conditions. The embodiment of the vehicle occupant protection device 10 illustrated in FIGS. 1 and 4 includes four sensors for sensing vehicle occupant conditions. The four sensors include a seat position sensor 182, a seat weight sensor 184, a seat belt usage sensor 186, and an occupant position sensor 188.

Each of the four sensors 182, 184, 186, and 188 is of a known construction. For example, the seat belt usage sensor 186 may be a buckle latching sensor for sensing whether the tongue assembly of the seat belt assembly 24 is latched in a buckle assembly of the seat belt assembly. Alternatively, the seat belt usage sensor 186 may monitor a withdrawn length of the seat belt webbing from a retractor of the seat belt assembly 24 for determining whether the seat belt assembly is being used. The occupant position sensor 188 may be an ultrasonic sensor or a vision system for determining the position of the occupant 26 relative to the instrument panel 32.

The vehicle occupant protection apparatus 10 also includes a sensor for sensing a vehicle condition and for providing a vehicle condition signal indicative of the sensed vehicle condition. The vehicle condition sensor illustrated in FIGS. 1 and 4 is a crash severity sensor 190. The crash severity sensor 190 may be formed from one or more accelerometers that monitor acceleration of the vehicle 14.

As is illustrated schematically in FIGS. 1 and 4, each of the sensors 182, 184, 186, 188, and 190 is electrically connected to an electronic control module 196. The electronic control module 196 preferably includes a microprocessor. The electronic control module 196 receives power from a power source (not shown), preferably the vehicle battery. The electronic control module 196 is also electrically connected to and controls the inflator 36 of the air bag module 30 and the first and second release mechanisms 170 and 172. The electronic control module 196 may include circuitry that would prevent the energization of the first and second release mechanisms 170 and 172 except upon actuation of the inflator 36 of the air bag module 30.

The electronic control module 196 performs a known algorithm for determining whether the inflator 36 should be actuated for inflating the air bag 38. The electronic control module 196 may be responsive to signals from any one or more of the sensors 182, 184, 186, 188, and 190 for controlling actuation of the inflator 36. The electronic control module 196 may also responsive to signals from any one or more of the sensors 182, 184, 186, 188, and 190 for controlling actuation of the first and second release mechanisms 170 and 172. The first and second release mechanisms 170 and 172 may be actuated separately and independently of one another.

In the embodiment illustrated in FIGS. 1 and 4, the electronic control module 196 is responsive to the signals from all of the sensors 182, 184, 186, 188, and 190 for determining whether or not inflation of the air bag 38 is desirable for helping to protect the occupant 26 of the vehicle 14. When the electronic control module 196 determines that inflation of the air bag 38 is desired, the electronic control module 196 is also responsive to the signals from the sensors 182, 184, 186, 188, and 190 for controlling actuation of the primary and secondary stages 40 and 42 of the inflator 36 and for controlling actuation of the first and second release mechanisms 170 and 172.

When the inflator 36 of the air bag module 30 is actuated, inflation fluid fills the chamber 102 of the reaction can 56 and the air bag 38 begins to inflate. Pressure from the inflation fluid in the chamber 102 acts against the closing portions 112 of the first and second vent members 106 and 108. When a force resulting from the pressure exceeds the predetermined value, the closing portions 112 of the first and second vent members 106 and 108 move from a closed position in which the first and second vent members cover the first and second vent openings 78 and 80, respectively, to an open position in which the first and second vent members 106 and 108 are spaced apart from the first and second vent openings. When the first and second vent members are in the open position, inflation fluid may exit the chamber 102 through the first and second vent openings 78 and 80.

As inflation fluid from the inflator 36 continues to fill the chamber 102 and the air bag 38, the air bag 38 inflates away from the reaction can 56 and generally toward the occupant 26. When the first and second release mechanisms 170 and 172 remain unactuated, the restraining portions 154 and 162 of the first and second tethers 144 and 146, respectively, remain secured relative to the reaction can 56. As a result, the air bag 38 inflates into the configuration illustrated in FIG. 1. In the configuration illustrated in FIG. 1, the restraining portions 154 and 162 of the first and second tethers 144 and 146 limit the rearward movement of the air bag 38 away from the reaction can 56. Also, when the restraining portions 154 and 162 of the first and second tethers 144 and 146 remain secured to the reaction can 56, slack remains in the first and second tethers 144 and 146 between the locations at which the second ends 158 and 166 of the restraining portions 154 and 162, respectively, are attached and the first end portions 148. As a result, no forces are transferred through the first and second tethers 144 and 146 to the first and second vent members 106 and 108, respectively, and the first and second vent members remain in the open position.

If, for example, the first release mechanism 170 is actuated, as shown in FIG. 2, the restraining portion 154 of the first tether 144 is released from the reaction can 56. As a result, the upper portion, as viewed in FIG. 2, of the air bag 38 will expand until the first tether 144 is pulled taut. When the first tether 144 is pulled taut, a force of the expanding air bag 38 is transferred through the first tether 144 to the first vent member 106. When the force exceeds the predetermined value, the force moves the closing portion 112 of the first vent member 106 back toward the closed position. FIG. 3 illustrates the first vent member 106 moved back into the closed position.

The electronic control module 196, by controlling the actuation of the first and second release mechanisms 170 and 172, controls the force that is transferred from the air bag 38 to the first and second vent members 106 and 108 through the first and second tethers 144 and 146, respectively. If, for example, with reference to the first release mechanism 170, the electronic control module 196 actuates the first release mechanism 170 prior to tension arising between the first end 156 of the restraining portion 154 and the second end portion 150 of the first tether 144, the upper portion of the air bag 38 accelerates from its stored condition until the first tether 144 is pulled taut. The acceleration of the inflating air bag 38 generally increases as the distance between the outer panel 46 of the air bag 38 and the reaction can 56 increases. As a result, a relative large force, which is a function of the acceleration of the air bag 38, is transferred through the first tether 144 to the first vent member 106. This relatively large force tends to exceed the predetermined value and thus, moves the first vent member 106 from the open position back toward the closed position.

If, for example, with reference to the second release mechanism 172, the electronic control module 196 actuates the second release mechanism 172 after tension arises between the first end 164 of the restraining portion 162 and the second end portion 150 of the second tether 146, as shown in FIG. 2, the lower portion, as viewed in FIGS. 2 and 3, of the air bag 38 accelerates from its partially expanded condition, shown in FIG. 2, until the second tether 146 is pulled taut. Tension between the first end 164 of the restraining portion 162 and the second end portion 150 of the second tether 146 tends to significantly decelerate, and possibly, stops, the outer panel 46 of the air bag 38. As a result, the acceleration of the lower portion of the air bag 38 is significantly less than the acceleration of the upper portion of the air bag described in the previous example in which the first release mechanism is actuated. This significantly lower acceleration results in a relatively small force that is transferred through the second tether 146 to the second vent member 108. This relatively small force tends to be less than the predetermined value for moving the second vent member 108. As a result, the second vent member 108 remains open, as shown in FIG. 3.

With the air bag module 30 illustrated in FIGS. 1-3, the electronic control module 196 is operable for controlling the first and second release mechanisms 170 and 172 for providing a desired inflation depth, shape, and pressure of the air bag 38. The inflation depth of the air bag 38 is the distance between the reaction can 56 and the outer panel 46 of the inflated air bag. The inflation depth may range from a minimum depth when the first ends 156 and 164 of the restraining portions 154 and 162 of the first and second tethers 144 and 146, respectively, remain secured to the reaction can 56, as shown in FIG. 1, to a maximum depth when the first ends of the restraining portions of the first and second tethers are released from the reaction can and the first and second vent members 106 and 108 completely close the first and second vent openings 78 and 80, respectively.

The shape of the inflated air bag 38 also varies dependent upon the secured or released condition of the first ends 156 and 164 of the restraining portions 154 and 162 of the first and second tethers 144 and 146, respectively. When the restraining portions 154 and 162 of the first and second tethers 144 and 146 remain attached to the reaction can 56, the air bag 38 has the inflation shape illustrated in FIG. 1. When the restraining portion 154 of the first tether 144 is released from the reaction can 56 and the restraining portion 162 of the second tether 146 remains secured to the reaction can, the upper portion of the air bag 38 extends farther outward of the reaction can 56 than the lower portion of the air bag. Similarly, when the restraining portion 162 of the second tether 146 is released from the reaction can 56 and the restraining portion 154 of the first tether 144 remains secured to the reaction can, the lower portion of the air bag 38 extends farther outward of the reaction can than the upper portion of the air bag. When the restraining portions 154 and 162 of both the first and second tethers 144 and 146 are released from the reaction can 56, the upper and lower portions of the air bag 38 extend away from the reaction can 56 by approximately equal distances.

The inflation pressure of the air bag 38 varies dependent upon the position of the first and second vent members 106 and 108. The inflation pressure of the air bag 38 may also be varied by controlling actuation of the primary and secondary stages 40 and 42 of the inflator 36 when a two-stage inflator is provided. When the first and second vent members 106 and 108 remain in an open position, as shown in FIG. 1, the inflation pressure in the air bag 38 is minimized as inflation fluid may exit the air bag 38 through the first and second vent openings 78 and 80. When both the first and second vent members 106 and 108 are moved to the closed position, the inflation pressure in the air bag 38 is maximized as inflation fluid may no longer exit the air bag through either of the first and second vent openings 78 and 80. An intermediated inflation pressure may result from one of the first and second vent members 106 and 108 remaining in the open position while the other of the first and second vent members is moved to the closed position. FIG. 5 sets forth six combinations of the bag depth and inflation pressure that may be obtained for the air bag 38 of the air bag module 30 of the vehicle occupant protection apparatus 10 of FIGS. 1-4. FIG. 5 also sets forth the associated functions of the electronic control module 196 for obtaining the respective combinations.

Figure 6:
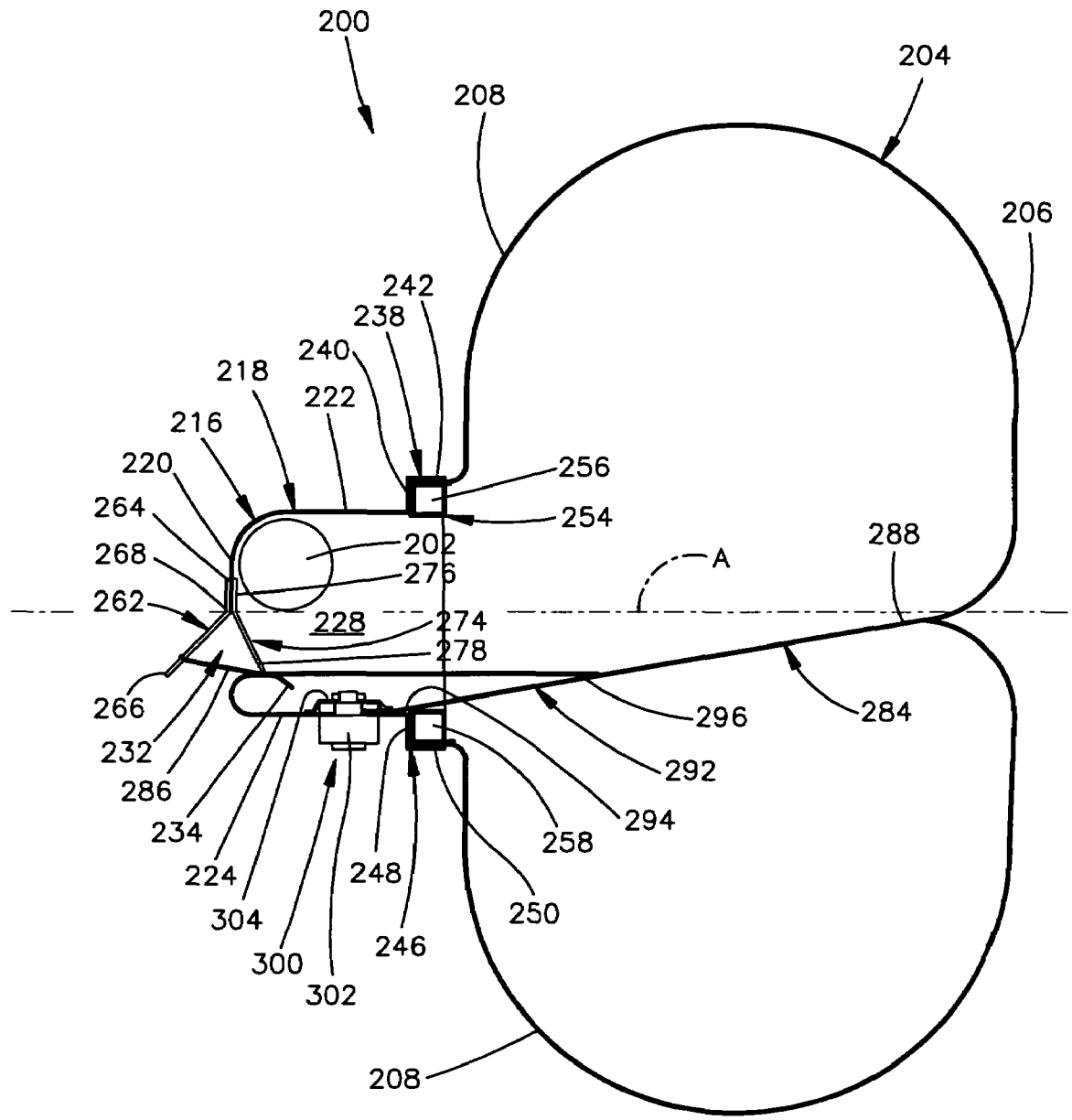
FIG. 6 is a schematic representation of an alternative air bag module that may be used with the vehicle occupant protection apparatus of FIG. 1 and in which an air bag is inflated to a minimum inflation volume.
Figure 7:
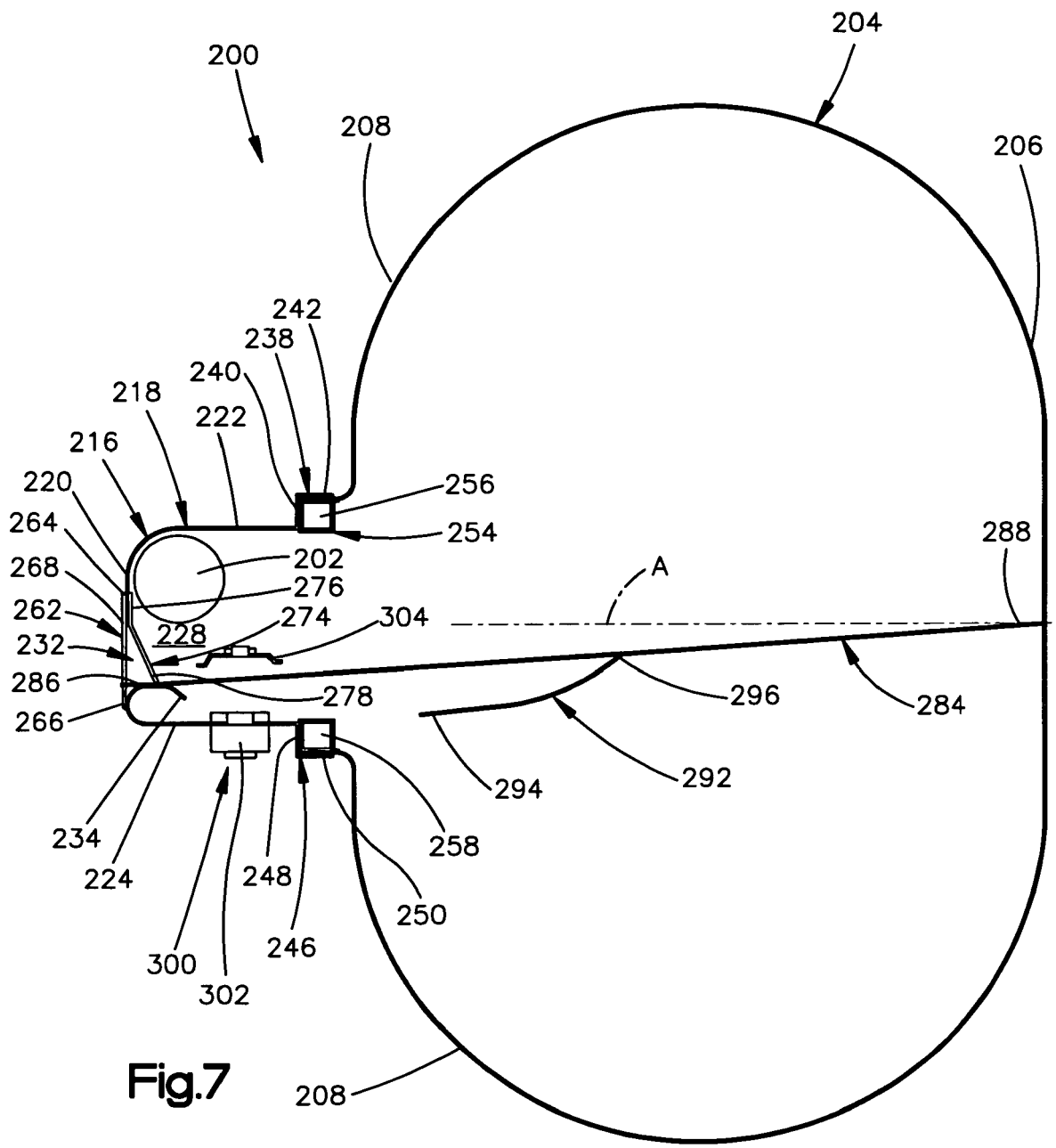
FIG. 7 is an illustration of the air bag module of FIG. 6 in which the air bag is inflated to a maximum inflation volume.

FIGS. 6 and 7 schematically illustrate an alternative air bag module 200 that may be used with the vehicle occupant protection apparatus 10 of FIG. 1. The air bag module 200 includes an inflator 202 and an air bag 204. The inflator 202 is actuatable for providing inflation fluid for inflating the air bag 204. The air bag 204 includes an outer panel 206 and side panels 208 that collectively define an inflatable volume of the air bag. Ends of the side panels 208 opposite the outer panel 206 define a mouth portion of the air bag 204.

The air bag module 200 also includes a support member 216. The support member 216 illustrated in FIGS. 6 and 7 is a reaction can. The reaction can 216 supports the inflator 202 and the air bag 204 and receives the reaction forces associated with actuation of the inflator and inflation of the air bag.

With reference to FIG. 6, the reaction can 216 includes a main body portion 218 and opposite side wall portions (not shown) that close laterally opposite sides of the main body portion. The main body portion 218 has an end wall 220 and opposite upper and lower walls 222 and 224, respectively. The upper and lower walls 222 and 224 extend generally perpendicular to the end wall 220. A portion of the end wall 220 extends out of the plane of the end wall and into a chamber 228 of the reaction can 216 to form a vent opening 232 in the end wall 220. The portion of the end wall 220 that extends into the chamber 228 forms a curved tether guide member 234.

The upper wall 222 terminates at an end opposite the end wall 220 with a generally L-shaped retaining portion 238. A first portion 240 of the retaining portion 238 extends away from the upper wall 222 and is oriented generally perpendicular to axis A. A second portion 242 of the retaining portion 238 extends away from the first portion 240 and is oriented generally parallel to axis A.

The lower wall 224 of the main body portion 218 of the reaction can 216 is a mirror-image of the upper wall 222. The lower wall 224 also terminates at an end opposite the end wall 220 with a generally L-shaped retaining portion 246. A first portion 248 of the retaining portion 246 extends away from the lower wall 224 and is oriented generally perpendicular to axis A. A second portion 250 of the retaining portion 246 extends away from the first portion 248 and is oriented generally parallel to axis A.

A bag retainer 254 secures the air bag 204 relative to the reaction can 216. An upper rail 256 of the bag retainer 254 is received in the retaining portion 238 of the upper wall 222 of the reaction can 216. A lower rail 258 of the bag retainer 254 is received in the retaining portion 246 of the lower wall 224 of the reaction can 216. Fasteners (not shown) secure the bag retainer 254 relative to the reaction can 216.

The air bag module 200 also includes a vent member 262 that is associated with the vent opening 232. The vent member 262 includes an attaching portion 264 and a closing portion 266. A living hinge 268 separates the attaching portion 264 and the closing portion 266 and enables the closing portion to pivot relative to the attaching portion. The hinge 268 resists movement of the closing portion 266 relative to the attaching portion 264 until a force exceeding a predetermined value is applied to the closing portion.

The attaching portion 264 of the vent member 262 is secured to the end wall 220 of the reaction can 216 in a location slightly above, as viewed in FIG. 6, the vent opening 232. When the attaching portion 264 of the vent member 262 is secured to the end wall 220, the closing portion 266 of the vent member 262 completely closes the vent opening 232. The closing portion 266 of the vent member 262 is movable relative to the reaction can 216 for varying a flow area through which fluid may flow when exiting the reaction can through the vent opening 232.

The air bag module 200 also includes a tether locking member 274. The tether locking member 274 is a resilient, one-piece structure that includes a base portion 276 and a lock portion 278. The lock portion 278 is oriented at an obtuse angle relative to the base portion 276. The base portion 276 of the tether locking member 274 is attached to the end wall 220 of the reaction can 216 at a location within the chamber 228 of the reaction can and adjacent to the vent opening 232. An end of the lock portion 278 of the tether locking member 274 terminates adjacent the tether guide member 234.

A tether 284 is associated with the vent member 262. The tether 284 has opposite first and second end portions 286 and 288, respectively. The first end portion 286 is fixed to the vent member 262 and the second end portion 288 is secured to the outer panel 206 of the air bag 204. The tether 284 also includes a restraining portion 292. The restraining portion 292 of the tether 284 includes first and second ends 294 and 296, respectively. The second end 296 of the restraining portion 292 is sewn to the tether 284 at a location intermediate the first and second end portions 286 and 288. The restraining portion 292 of the tether 284 has a length that is shorter than a distance between the location on the tether at which the second end 296 of the restraining portion is attached and the first end portion 286 of the tether.

When extending between the outer panel 206 of the air bag 204 and the vent member 262, the tether 284 extends between the tether guide member 234 and the tether locking member 274. The tether locking member 274 cooperates with the tether guide member 234 to prevent movement of the tether 284 leftward, as viewed in FIGS. 6 and 7, between the tether locking member and the tether guide member and toward the vent member 262. The lock portion 278 of the tether locking member 274 bends rightward, as viewed in FIGS. 6 and 7, to enable movement of the tether 284 rightward between the tether locking member and the tether guide member 234 and toward the outer panel 206 of the air bag 204.

The air bag module 200 also includes a release mechanism 300 that is attached to the lower wall 224 of the reaction can 216. In the air bag module 200 illustrated in FIGS. 6 and 7, the release mechanism 300 is a pyrotechnic bolt. The pyrotechnic bolt 300 includes an actuation portion 302 and a releasing portion 304. The actuation portion 302 is responsive to a signal from the electronic control module 196 (FIG. 1) for actuating a pyrotechnic charge to release the releasing portion 304.

The pyrotechnic bolt 300 is attached to the lower wall 224 of the reaction can 216 so that the actuation portion 302 is located substantially outside of the chamber 228 and the releasing portion 304 is located within the chamber. The first end 294 of the restraining portion 292 of the tether 284 is secured between the actuation portion 302 and the releasing portion 304 of the pyrotechnic bolt 300. While the pyrotechnic bolt 300 is unactuated, the first end 294 of the restraining portion 292 of the tether 284 is secured relative to the lower wall 224 of the reaction can 216. When the pyrotechnic bolt 300 is actuated, the first end 294 of the restraining portion 292 of the tether 284 is released from the pyrotechnic bolt 300 and is free to move relative to the reaction can 216.

When the vehicle occupant protection apparatus 10 of FIG. 1 includes the air bag module 200 of FIGS. 6 and 7, the electronic control module 196 is responsive to the signals from any one or more of the sensors 182, 184, 186, 188, and 190 for controlling actuation of the pyrotechnic bolt 300. When the inflator 202 of the air bag module 200 is actuate, inflation fluid fills the chamber 228 of the reaction can 216 and the air bag 204 begins to inflate. Pressure from the inflation fluid in the chamber 228 results in a force that exceeds the predetermined value that moves the closing portion 266 of the vent member 262 from a closed position to an open position, shown in FIG. 6. When the vent member 262 is in the open position, inflation fluid may exit the chamber 228 through the vent opening 232.

As inflation fluid from the inflator 202 continues to fill the chamber 228 and the air bag 204, the air bag 204 inflates away from the reaction can 216. When the pyrotechnic bolt 300 remains unactuated, the air bag 204 inflates into the configuration illustrated in FIG. 6. In FIG. 6, the first end 294 of the restraining portion 292 of the tether 284 remains secured to the reaction can 216 and acts to limit the movement of the air bag 204 away from the reaction can. Also, when the first end 294 of the restraining portion 292 remains secured to the reaction can 216, slack remains in the tether 284 between the location at which the second end 296 and the restraining portion 292 is attached to the tether 284 and the first end portion 286. As a result, no force is transferred through the tether 284 to the vent member 262 and the vent member remains in the open position.

If the pyrotechnic bolt 300 is actuated, as shown in FIG. 7, the air bag 204 will expand until the tether 284 is pulled taut. The force of the expanding air bag 204 is transferred through the tether 284 and acts on the vent member 262. When the force exceeds the predetermined value, the vent member 262 moves from the open position back toward the closed position. FIG. 7 illustrates the vent member 262 moved back into the closed position.

The electronic control module 196 controls the actuation of the pyrotechnic bolt 300 to control the force that is transferred from the air bag 204 to the vent member 262 through the tether 284. If, for example, the electronic control module 196 actuates the pyrotechnic bolt 300 prior to tension arising between the first end 294 of the restraining portion 292 and the second end portion 288 of the tether 284, the air bag 204 accelerates from its stored condition until the tether 284 is pulled taut, as shown in FIG. 7. As a result, a relative large force, which is a function of the acceleration of the air bag 204, is transferred through the tether 284 to the vent member 262. This relatively large force tends to exceed the predetermined value and moves the vent member 262 from the open position back into the closed position. If, for example, the electronic control module 196 actuates the pyrotechnic bolt 300 after tension arises between the first end 294 of the restraining portion 292 and the second end portion 288 of the tether 284, as shown in FIG. 6, the air bag 204 accelerates from its partially expanded condition, shown in FIG. 6, until the tether 284 is pulled taut. Tension between the first end 294 of the restraining portion 292 and the second end portion 288 of the tether 284 tends to significantly decelerate, and possibly, stops, the outer panel 206 of the air bag 204. As a result, a relatively small force is transferred through the tether 284 to the vent member 262. This relatively small force tends to be less than the predetermined value for moving the closing portion 266 of the vent member 262. As a result, the vent member 262 remains in the open position.

The air bag 204 of the air bag module 200 illustrated in FIGS. 6 and 7 provides three combinations of bag depth and inflation pressure. The three combinations include (i) small bag depth and low inflation pressure; (ii) large bag depth and low inflation pressure; and (iii) large bag depth and high inflation pressure. The vent member 262 remains in the open position when the air bag 204 has a low inflation pressure. The vent member 262 is moved to the closed position when the air bag 204 has a high inflation pressure.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant protection apparatus comprising:
an inflatable occupant protection device;
a support member having a vent opening through which inflation fluid may flow;
a vent member movable relative to the support member for varying a flow of inflation fluid through the vent opening;
a tether for moving the vent member; and
an actuatable mechanism;
the tether having a first end secured to the vent member, a second end secured to the protection device, and a restraining portion between the first end and the second end and connected to the actuatable mechanism;
the actuatable mechanism having a first condition securing the restraining portion and thereby preventing the tether from moving the vent member and a second condition releasing the restraining portion and thereby enabling the tether to move the vent member.

2. The vehicle occupant protection apparatus of claim 1 wherein the tether, when in the second condition, is responsive to inflation of the inflatable occupant protection device beyond a predetermined distance for transferring a force to the vent member for moving the vent member.

3. The vehicle occupant protection apparatus of claim 1 further comprising a tether locking member that engages the tether between the vent member and the actuatable mechanism, the tether locking member resisting movement of the tether in a first direction pulling the vent member closed until the force transferred by the tether exceeds a predetermined value.

4. The vehicle occupant protection apparatus of claim 3 wherein the tether locking member locks the tether against movement in a second direction opposite the first direction and thereby blocks the vent member from movement toward an open condition.

5. The vehicle occupant protection apparatus of claim 4 wherein the force that is transferred by the tether to the vent member tends to exceed the predetermined value and moves the vent member when the mechanism is actuated into the second condition prior to tension arising in the restraining portion of the tether, the force tending to be less than the predetermined value when the mechanism is actuated into the second condition after tension arises in the restraining portion of the tether.

6. The vehicle occupant protection apparatus of claim 1 further including a controller for controlling actuation of the mechanism, the controller being responsive to at least one occupant condition sensor for controlling actuation of the mechanism.

7. The vehicle occupant protection apparatus of claim 6 wherein the at least one occupant condition sensor is a sensor for providing the controller with information regarding occupant position relative to the support member.

8. The vehicle occupant protection apparatus of claim 6 wherein the at least one occupant condition sensor is a sensor for providing the controller with information regarding occupant weight.

9. The vehicle occupant protection apparatus of claim 6 wherein the at least one occupant condition sensor is a sensor for providing the controller with information regarding occupant seat belt usage.

10. The vehicle occupant protection apparatus of claim 1 further including a controller for controlling actuation of the mechanism, the controller being responsive to a vehicle condition sensor for controlling actuation of the mechanism.

11. The vehicle occupant protection apparatus of claim 1 wherein the vent opening is a first vent opening, the vent member is a first vent member, the tether is a first tether, and the actuatable mechanism is a first mechanism, the support member also having a second vent opening, a second vent member movable for varying a flow of inflation fluid through the second vent opening, a second tether for moving the second vent member, and a second mechanism having a first condition preventing the second tether from moving the second vent member and a second condition enabling the second tether to move the second vent member, the second mechanism being actuatable separately and independently from the first mechanism.

12. The vehicle occupant protection apparatus of claim 1 wherein the restraining portion restrains the protection device from reaching a fully deployed condition when the actuatable mechanism is in the first condition.

13. The vehicle occupant protection apparatus of claim 1 wherein the restraining portion does not restrain the protection device from reaching a fully deployed condition when the actuatable mechanism is in the second condition.

14. A vehicle occupant protection apparatus comprising:
an inflatable occupant protection device;
a support member having a vent opening through which inflation fluid may flow;
a vent member movable relative to the support member for varying a flow of inflation fluid through the vent opening;
a tether for moving the vent member; and
an actuatable mechanism;
the tether having a first end secured to the vent member, a second end secured to the protection device, and a restraining portion between the first end and the second end and connected to the actuatable mechanism;
the actuatable mechanism having a first condition securing the restraining portion and thereby preventing the tether from moving the vent member and a second condition releasing the restraining portion and thereby enabling the tether to move the vent member, wherein;
the inflatable occupant protection device, when the mechanism is in the first condition, is inflatable into a first configuration in which the restraining portion of the tether limits an inflation depth of the inflatable occupant protection device;
the inflatable occupant protection device, when the mechanism is in the second condition, is inflatable into a second configuration having an inflation depth that is greater than the inflation depth of the inflatable occupant protection device when in the first configuration; and
wherein the tether tends to move the vent member to vary the flow of inflation fluid through the vent opening when the mechanism is actuated prior to the inflatable occupant protection device reaching the first configuration, the vent member resisting movement when the mechanism is actuated after the inflatable occupant protection device reaches the first configuration.

15. The vehicle occupant protection apparatus of claim 14 further including a controller for controlling actuation of the mechanism, the controller being responsive to at least one occupant condition sensor for controlling actuation of the mechanism.

16. The vehicle occupant protection apparatus of claim 15 wherein the at least one occupant condition sensor is a sensor for providing the controller with information regarding occupant position relative to the support member.

17. The vehicle occupant protection apparatus of claim 15 wherein the at least one occupant condition sensor is a sensor for providing the controller with information regarding occupant weight.

18. The vehicle occupant protection apparatus of claim 15 wherein the at least one occupant condition sensor is a sensor for providing the controller with information regarding occupant seat belt usage.

19. The vehicle occupant protection apparatus of claim 14 further including a controller for controlling actuation of the mechanism, the controller being responsive to a vehicle condition sensor for controlling actuation of the mechanism.

* * * * *